United States Patent [19]

Riemer et al.

[11] Patent Number: 4,675,026

[45] Date of Patent: Jun. 23, 1987

[54] METHOD OF REDUCING VISCOSITY IN AQUEOUS COAL SLURRIES BY USE OF PARTIAL ESTERS OF POLYCARBOXYLIC ACIDS

[75] Inventors: Heinz Riemer, Bottrop; Werner Friedrich, Herten, both of Fed. Rep. of Germany

[73] Assignee: Huels Aktiengesellschaft, Marl, Fed. Rep. of Germany

[21] Appl. No.: 845,234

[22] Filed: Mar. 28, 1986

[30] Foreign Application Priority Data

Nov. 2, 1985 [DE] Fed. Rep. of Germany ....... 3538984
Nov. 7, 1985 [DE] Fed. Rep. of Germany ....... 3539431

[51] Int. Cl.$^4$ .............................................. C10L 1/32
[52] U.S. Cl. .......................................... 44/51; 44/66; 44/70; 44/71; 260/404.5
[58] Field of Search .................... 44/51, 66, 70, 71; 260/404.5

[56] References Cited

U.S. PATENT DOCUMENTS

| | | | |
|---|---|---|---|
| 3,320,212 | 5/1967 | Shen et al. | 44/51 |
| 3,907,518 | 9/1975 | Machleder et al. | 44/66 |
| 3,912,771 | 10/1985 | Kuhn et al. | 44/66 |
| 4,072,474 | 2/1978 | Kuhn et al. | 44/66 |
| 4,302,212 | 11/1981 | Yamamura et al. | 44/51 |
| 4,358,293 | 11/1982 | Mark | 44/51 |
| 4,392,865 | 7/1983 | Grosse et al. | 44/62 |

FOREIGN PATENT DOCUMENTS 1141601 12/1962 Fed. Rep. of Germany.
3240309 5/1984 Fed. Rep. of Germany.

*Primary Examiner*—William R. Dixon, Jr.
*Assistant Examiner*—Margaret B. Medley
*Attorney, Agent, or Firm*—Oblon, Fisher, Spivak, McClelland & Maier

[57] ABSTRACT

A method of reducing the viscosity of an aqueous coal slurry, which comprises adding a viscosity-reducing effective amount of a partial ester of particular aliphatic, cycloaliphatic or aromatic polycarboxylic acids with particular phenyl polyglycol ethers substituted by alkyl or alkylaryl groups having the formula I

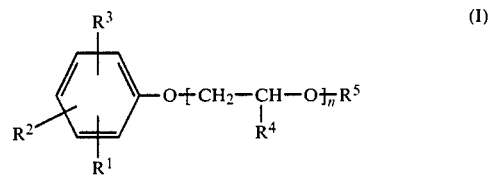

is disclosed, along with aqueous coal slurries containing the viscosity-reducing compound.

18 Claims, No Drawings

METHOD OF REDUCING VISCOSITY IN AQUEOUS COAL SLURRIES BY USE OF PARTIAL ESTERS OF POLYCARBOXYLIC ACIDS

BACKGROUND OF THE INVENTION

1. Field of the Invention

This invention relates to the use of esters or partial esters of aromatic, cycloaliphatic and aliphatic polycarboxylic acids with phenyl polyglycol ethers substituted by aryl, alkyl or aralkyl groups for the preparation of coal/water suspensions.

2. Description of the Prior Art

Aqueous coal (dust) slurries have been the subject of increasing interest because of their ease in handling in transport and their good combustion/gasification characteristics when coal is used as an energy carrier or a chemical raw material.

With respect to both long-distance transport and the energy balance of such suspensions in the combustion process, it is of interest to prepare suspensions which are as high in solids content as possible but which possess as low a viscosity as possible and are stable via-a-vis sedimentation and shear stress.

Polymers and polycondensates, such as polysaccharides, carboxymethylcellulose, gum arabic, xanthan gum, guar gum or copolymers, and others have been successfully used in the prevention of premature sedimentation.

There have been many efforts to reduce viscosity for a given water content by the addition of additives or to increase the solids contents of suspensions for a given viscosity.

The following surface-active substances have been proposed for this purpose: anionic surfactants—U.S. Pat. No. 4,282,006, U.S. Pat. No. 4,302,212, U.S. Pat. No. 4,330,301, U.S. Pat. No. 4,304,572, Japanese Pat. No. 030963; nonionic surfactants—European Pat. No. 0,132,712-A, European Pat. No. 0,013,146-A, European Pat. No. 0,008,628, Swedish Pat. No. 002,878, Swedish Pat. No. 002,879, U.S. Pat. No. 4,276,054, European Pat. No. 0.109,740-A, European Pat. No. 0,057,576; and zwitterionic surfactants—WO-A No. 83/03618.

Mixtures of the above types have been frequently proposed, for example in European Pat. No. 0,057,576.

The proposed additives for the coal/water slurries are of varying effectiveness with respect to viscosity reduction and stability vis-a-vis sedimentation and effects of shear stress, depending on the type, origin and processing of the coal used.

Although numerous additives have been proposed, a need continues to exist for new additives for coal/water slurries with increased effectiveness in reducing viscosity and maintaining stability with respect to sedimentation and the effects of shear stress.

SUMMARY OF THE INVENTION

Accordingly, it is an object of the present invention to provide an additive which, on being added to aqueous coal slurries with a solids content of about 60% of coal, would bring about as strong a viscosity reduction as possible, while maintaining its effectiveness even under normal conditions of shear.

It is another object of the present invention to provide an aqueous coal slurry which contains a viscosity reducer and which has a solids content of about 60% of coal while exhibiting reduced viscosity and effectiveness under normal conditions of shear.

According to the present invention, the foregoing and other objects are attained by the use of viscosity reducers which are derivatives of substituted phenyl polyalkylene glycol ethers of formula I

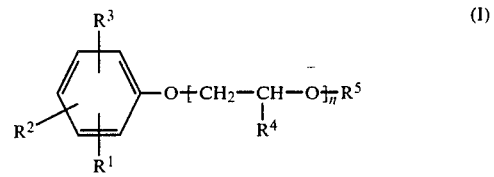

wherein $R^1$, $R^2$ and $R^3$ are the same or different and denote hydrogen, straight-chain or branched alkyl radicals with 1 to 18 carbon atoms in the alkyl radical, alkyl radicals substituted by aralkyl with 1 to 10 carbon atoms in both alkyl radicals, or an aralkyl, napthyl-alkyl or anthracyl-alkyl group with 1 to 18 carbon atoms in the alkyl group, n represents a number of 30 to 400, $R^4$ denotes hydrogen, or a methyl, ethyl or propyl radical, $R^5$ denotes a radical of the form

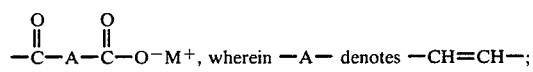

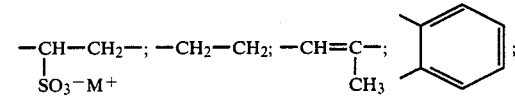

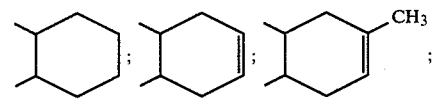

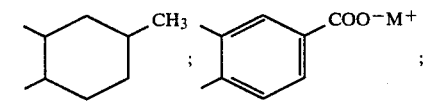

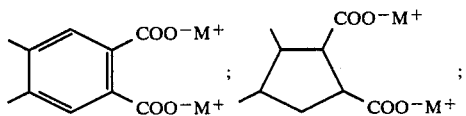

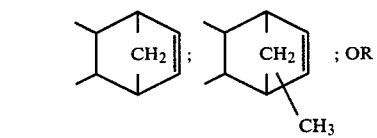

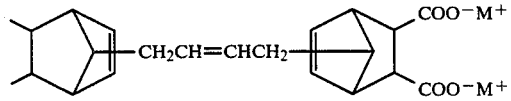

in which $M^+$ represents a hydrogen ion, a metal ion, an ammonium ion, or a cation of the type $H^+NH_2R^6$, wherein $R^6$ denotes an unsubstituted or substituted alkyl, cycloalkyl or aryl radical.

DETAILED DESCRIPTION OF THE INVENTION

In formula I above, when the radicals $R^1$, $R^2$ and $R^3$ denote a phenyl, napthyl or anthracyl radical which may or may not be substituted, the substituents which may be used are straight-chain or branched alkyl radicals with 1–18, preferably 1–12, carbon atoms.

When $R^1$, $R^2$ and $R^3$ represent alkyl radicals, alkyl according to the invention denotes a straight-chain or branched hydrocarbon radical with 1–18, preferably 8–16 carbon atoms.

Suitable examples of alkyl radicals and substituents of the above-mentioned aryl radicals, are: methyl, ethyl, propyl, isopropyl, butyl, isobutyl, pentyl, isopentyl, hexyl, isohexyl, octyl, isooctyl, nonyl, isononyl, dodecyl, isododecyl, stearyl and isostearyl.

Preferred derivatives of phenyl polyalkylene glycol ethers are those for which the number of carbon atoms of $R^1+R^2+R^3$ must be 12 to 30, in particular those in which $R^1 = H$ and $R^2$ and $R^3$ are nonyl or isononyl radicals. When $R^1$, $R^2$ or $R^3$ represent aryl-substituted alkyl radicals, styryl or alkylstyryl radicals are particularly preferred.

When $R^1$, $R^2$ and $R^3$ denote alkyl radicals substituted by aralkyl, the following alkyl radicals are suitable for use: methyl, ethyl, propyl, isopropyl, butyl, isobutyl, pentyl, isopentyl, hexyl, isohexyl, octyl, isooctyl, nonyl, isononyl, decyl and isodecyl.

The index n determines the length of the polyalkylene glycol chain. In general the chain consists of 30–400 units. Because of the process of preparation, n in its statistical mean can also be in the form of a fraction. The preferred value of n is 30 to 250, in particular between 50 and 120.

$R^4$ as the substituent of the polyalkylene glycol chain can denote hydrogen or an alkyl radical with 1 to 3 carbon atoms, wherein within the polyalkylene glycol chain the radicals $R^4$ can have a different meaning and thus be distributed statistically or in blocks.

In contrast to the compounds described in German Offenlegungsschrift No. 3,240,309, the partial esters of aromatic polycarboxylic acids of the above-mentioned phenyl polyalkylene glycol ethers for use according to the invention exhibit, besides the marked viscosity-reducing action on coal/water slurries, a distinct stabilization of the slurries with respect to the effects of shear sress and sedimentation.

The following substituted phenyl polyalkylene glycol ethers are particularly preferred for subsequent reaction with the named anhydrides: diisooctylphenyl polyalkylene glycol ether, diisononylphenyl polyalkylene glycol ether, dodecylphenyl polyalkylene glycol ether, hexadecylphenyl polyalkylene glycol ether, dioctylphenyl polyalkylene glycol ether, dinonylphenyl polyalkylene glycol ether, di(phenylethyl)phenyl polyalkylene glycol ether, tri(phenylethyl)phenyl polyalkylene glycol ether, as well as mixtures of the listed substituted phenyl polyalkylene glycol ethers; the polyalkylene glycol ether chains can consist of polyethylene oxides, statistically distributed polyethylene oxide-polypropylene oxide copolymers or polyethylene oxide-polypropylene oxide block copolymers.

Esterification components which are particularly preferred, are the anhydrides of trimellitic acid, phthalic acid and pyromellitic acid, the last named acid being usable with particular advantage in the form of the diester of the above-mentioned alkyl or aralkyl polyalkylene glycol ether.

The partial esters of the above substituted polyalkylene glycol phenyl ethers according to the invention are generally soluble in water and are preferably used in the form of a neutral aqueous solution.

Suitable neutralization agents are preferably NaOH or amines, for example 1-phenyl-1-aminobutane, 1-phenylaminoethane or 4-tert-butylcyclohexylamine.

The compounds according to the invention are normally used in aqueous solution in concentrations of from 10 to 60% by weight; if desired, water-alcohol mixtures may also be used. For the preparation of the coal/water slurries, these solutions may be diluted to the concentrations which, according to the specific coals, give optimal viscosity properties.

In principle it is also possible, however, to add the partial esters in solid form and to carry out the neutralization during the preparation of the coal/water slurry. Since in some cases the compounds to be used according to the invention form additive concentrates with water which are difficult to handle, it may be advantageous to use as solubilizing agents other organic, water-miscible solvents, in particular the lower aliphatic alcohols.

According to the invention, the term coal comprises both mineral and synthetic coal, for example lignite, anthracite, coke (prepared either from coal or from petroleum), black coal, bituminous coal, subbituminous coal or consists of mine tailings or fines. The untreated pulverized raw coal may also be beneficiated, i.e. cleaned of amounts of ash and sulfur. Any known cleaning process—like the heavy media separation process, the oil agglomeration process, the flotation process—may be applied for preparing cleaned coal according to the invention. The list also includes pure carbon in the form of its graphite modification.

The preferred form of coal used is finely ground coal with a particle size of $<300$ μm, in particular with a particle size distribution of $<100$ μm for 75–100%

The aqueous coal slurries according to the invention contain the finely ground coal or the coal dust in quantities of 30–85% by weight, preferably 55–80% by weight.

The coal/water slurries according to the invention contain the partial ester of the above substituted phenyl polyalkylene glycol ethers in a quantity from 0.1 to 3% by weight, preferably from 0.3 to 1.5% by weight; if desired, the partial ester may be used in the neutralized form.

In the preparation of the aqueous coal slurries according to the invention, the order of adding the individual components may be varied.

The preferred method of preparation consists of stirring the powdered coal of the described particle size distribution into an aqueous solution of the particular substituted phenyl polyalkylene glycol ether derivative.

It is also possible, however, to subject a mixture of coarse-grain coal and the aqueous solution of the particular substituted phenyl polyalkylene glycol ether to a grinding process, in order to obtain a coal slurry with the desired particle size.

In addition, a part of the water present in the aqueous coal slurries according to the invention may be replaced by other fuels, for example methanol, ethanol, isopropanol, etc.

In comparison with known aqueous coal slurries, the aqueous coal slurries according to the invention exhibit, besides improved flow characteristics, a clearly improved behavior against shear stress. The latter is particularly significant for some problematical varieties of coal, for example coal 2 as described below, which may at first consist of free-flowing aqueous coal slurries destined, for example, for transport to heating installations or for storage, but which can under prolonged shearing action such as pumping or stirring, lead to "cementation".

The storage characteristics of the aqueous coal slurries according to the invention are equivalent to the known appearance of aqueous coal slurries described up to now.

This means that even after storage they can be readily set into motion and can be pumped and stirred even after storage.

In comparison with the appearance of aqueous coal slurries known up to now, the advantages of the aqueous coal slurries according to the invention become particularly clear with respect to their industrially important behavior at low shear velocities. The values cited in the application examples for low shear velocities ("initial viscosity") are an indication of the flow properties to be expected after, for example, prolonged storage or at low transport velocities in pipelines.

The invention now being generally described, the same will be better understood with reference to certain particular examples which are intended for purposes of illustration only and are not intended to be limiting of the invention except where so indicated.

PREPARATION OF THE PARTIAL ESTERS OF SUBSTITUTED PHENYL POLYALKYLENE GLYCOL ETHERS

EXAMPLE 1

351 g of 98% di-isononylphenol, obtained in large-scale manufacture, are heated with 3 g of NaOH as catalyst in a pressure vessel, filled with $N_2$, to 130° C. After blowing out of the water resulting from the phenolate formation, 3634 g of ethylene oxide are added at 130°–170° C. The reaction product is soluble in water and has a melting point of 51°–53° C. The degree of ethoxylation n is 80.

EXAMPLE 2

94 g of phenol are reacted with 208 g of styrene in the presence of 1 g of p-toluenesulfonic acid with a slow temperature rise from 130° to 160° C. The temperature is maintained at 150°–160° C. for about 1 hour. To the reaction mixture which has been allowed to cool to 120° C., 3 g of powdered KOH are added and the mixture is heated to 130°–160° C. under nitrogen. 3520 g of ethylene oxide are added at 130°–160° C. to the reaction space which is filled with $N_2$. The reaction product is soluble in water and has a melting point of 48°–50° C. The degree of ethoxylation n is 80.

EXAMPLE 3

94 g of phenol are reacted with 318 g of methylstyrene in the presence of 1 g of p-toluenesulfonic acid with a slow temperature rise from 130° to 160° C. The temperature is maintained at 150°–160° C. for about 1 hour. 3 g of powdered KOH are added to the reaction mixture which has been allowed to cool to 120° C., and the mixture is heated at 130°–160° C. under nitrogen. 4400 g of ethylene oxide are added at 130°–160° C. under a nitrogen blanket. The reaction product is soluble in water and has a melting point of 57°–58° C.

EXAMPLE 5

386.6 g of the dialkylphenyl polyalkylene glycol ether according to Example 1 are reacted portion-wise in a stirrer vessel, under nitrogen, with 19.2 g of trimellitic anhydride, the initial temperature being 80° C. The portion-wise addition of the anhydride is carried out in such a way that the initial temperature of 80° C. is not allowed to rise above 100° C. After the addition of the calculated amount of the anhydride, the contents of the reaction vessel are maintained at 80° C. for a further 2 hours.

After cooling, a product is obtained which is soluble in water and has a melting point of 44°–46° C.

EXAMPLE 6

386.6 g of the dialkyphenyl polyalkylene glycol ether according to Example 1 are reacted with 15.4 of hexahydrophthalic anhydride under conditions indicated in Example 5.

A product is obtained which is soluble in water and has a melting point of 44°–46° C.

EXAMPLE 7

386.6 of the dialkylphenyl polyalkylene glycol ether according to Example 1 are reacted with 14.8 g of phthalic anhydride (PA) under conditions indicated in Example 5.

A product is obtained which is soluble in water and has a melting point of 48°–50° C.

EXAMPLE 8

386.6 g of the dialkylphenyl polyalkylene glycol ether according to Example 1 are reacted with 21.8 of pyromellitic anhydride (PMA) under conditions indicated in Example 5.

A product is obtained which is soluble in water and has a melting point of 37°–40° C.

EXAMPLE 9

773.2 g of the dialkylphenyl polyalkylene glycol ether according to Example 1 are reacted with 21.8 g of PMA under conditions indicated in Example 5.

A product is obtained which is soluble in water and has a melting point of 43°–46° C.

EXAMPLE 10

382.2 g of the aralkylphenyl polyalkylene glycol ether according to Example 2 are reacted with 19.2 of trimellitic anhydride under conditions indicated in Example 5.

A product is obtained which is soluble in water and has a melting point of 47°–49° C.

EXAMPLE 11

386.6 g of the dialkylphenyl polyalkylene glycol ether according to Example 1 are reacted with 9.8 g of maleic anhydride (MA) under conditions indicated in Example 5.

A product is obtained which is soluble in water and has a melting point of 46°–48° C.

EXAMPLE 12

42.2 g of an approximately 25% aqueous sodium bisulfite solution, adjusted to a pH of 9.7 with NaOH, and 380 g of water that had been pre-warmed to about 50° C., are added at about 55° C. to 396.4 g of the reaction product described in Example 11 with vigorous stirring. Stirring is continued for 1.5 hours at 55° C.

After the reaction product has been allowed to cool to room temperature, the excess of the sodium bisulfite is determined by iodometry and converted to sodium sulfate by the addition of an equimolar amount of $H_2O_2$. The pH of the acidic end product is adjusted to 5.6 with 50% NaOH.

Application examples

The studies described below were carried out with the following varieties of coal, the data being based on water-free coal:

|  | Coal 1 | Coal 2 | Coal 3 |
|---|---|---|---|
| Ash: | 7.3% | 10.17% | 10.3% |
| Volatiles: | 32.7% | 37.20% | 32.3% |
| Sulfur: | 1.14% | 0.37% | 0.58% |
| Carbon: | 80.1% | 64.8% | 72.3% |
| Hydrogen: | 4.92% | 4.92% | 4.5% |
| Nitrogen: | 1.56% | 2.2% | 1.9% |
| Oxygen (calc.): | 5.0% | 14.6% | 11.2% |
| Ash composition: |  |  |  |
| $SiO_2$ | 40.9% | 52.42% | 34.27% |
| $Al_2O_3$ | 26.4% | 21.98% | 28.38% |
| $Fe_2O_3$ | 11.4% | 9.96% | 9.84% |
| $TiO_2$ | 1.0% | 0.80% | 1.42% |
| CaO | 6.6% | 3.55% | 10.51% |
| MgO | 3.3% | 2.35% | 2.56% |
| $Na_2O$ | 1.4% | 0.46% | 0.36% |
| $K_2O$ | 3.0% | 2.41% | 0.40% |
| $SO_3$ | 5.7% | 1.36% | 5.53% |
| $P_2O_5$ | 0.6% | 0.14% | 0.23% |
| Particle size determination: |  |  |  |
| <212 μm | — | 100% | 100% |
| <150 μm | 100% | 92% | 97.1% |
| <106 μm | 99.2% | 82.4% | 94.1% |
| <75 μm | 97.5% | 70.9% | 91.2% |
| <53 μm | 90.0% | 56.1% | 80.3% |
| <38 μm | 76.9% | 44.2% | 69.7% |
| <27 μm | 60.0% | 34.8% | 56.6% |
| <19 μm | 45.8% | 25.0% | 44.7% |
| <13 μm | 35.1% | 17.3% | 36.7% |
| <9.4 μm | 23.7% | 11.7% | 26.8% |
| <6.6 μm | 14.4% | 7.1% | 17.3% |
| <4.7 μm | 7.5% | 3.4% | 9.2% |

EXAMPLE 13

Preparation and testing of the aqueous coal slurry

Unless otherwise indicated, the coal slurries described in the following examples were prepared by the following procedure:

5.0 g of the 50% solution (solvent: 20% by weight of isopropanol/80% of water), adjusted to a pH of 7.0 with NaOH, of the partial ester additive according to Example 5 and 0.15 g of a commercially available anti-foam agent (25% aqueous silicone oil emulsion, type SE 57 ex Wacker) are added to 127.52 g of drinking water (13° of German hardness). 367.22 g of the above-mentioned finely ground coal 2, corresponding to 350 g of dry coal 2, are added with stirring (double rod laboratory-stirrer). Stirring is continued for a total of 5 minutes.

The product is an aqueous coal slurry; its viscosity at 20° C. is measured with a Brookfield viscometer (Model LVT) with spindle No. 3 at two different switch positions (6 and 60 r.p.m.), corresponding to different shear velocities.

Because of the non-Newtonian flow character of the aqueous coal slurries, constant values at particular speeds of rotation of the measuring spindle are obtained only after some time.

Since it is of practical importance to know, for example, the initial viscosity of an aqueous coal slurry at rest, the first readable viscosity at the speed of rotation of 6 r.p.m. ("initial viscosity") was taken to characterize the effectiveness of the additives according to the invention. The viscosity measured at 60 r.p.m. ("terminal viscosity"), after attaining a constant value for various readings, was taken to evaluate the effectiveness of the additives according to the invention.

For the aqueous coal slurries described above, the following were found: Brookfield LVT, measuring spindle 3, measurement at 20° C.

| Initial viscosity (6 r.p.m.) | Terminal Viscosity (60 r.p.m.) |
|---|---|
| 1,800 mPa.s. | 940 mPa.s |

The viscosities of aqueous coal slurries of a given solids concentration, measured at constant temperature, depend of the type of coal and the particle size distribution, and also substantially on the type of anti-foam agent added and on the processing (stirring apparatus, speed and duration of stirring), on the viscometer used or on the particular measuring system.

Thus, for example, the preparation of the above aqueous coal slurry in the planetary ball mill (type Pulverisette ex Fritsch GmbH, Idar-Oberstein) gave after 1 minute of stirring (at 320 r.p.m.) the following values:

Viscometer: Brookfield LVT, measuring spindle 3, measurement at 20° C.

| Initial viscosity (6 r.p.m.) | Terminal Viscosity (60 r.p.m.) |
|---|---|
| 1,200 mPa.s. | 820 mPa.s |

The coal slurry prepared in the planetary ball mill and having the above composition, at 20° C. gave the following viscosities, using a Haake viscometer (measuring body MV II P St):

| Shear velocity (D = 50 s$^{-1}$) | Shear velocity (D = 225 s$^{-1}$) |
|---|---|
| 880 mPa.s. | 530 mPa.s |

In order to make the effectiveness of the various additives comparable, the results of measurement given in the examples below are in each case taken by the Brookfield viscometer. For the preparation of the coal slurry, the work-up procedure (5 minutes stirring with the laboratory stirrer) was also standardized. Also, the type and concentration (based on dry coal dust) of the anti-foam agent were kept constant.

EXAMPLE 14

Effectiveness of the various additives according to the invention

Dry, finely ground coal dust of coal 2 is stirred, according to the procedure described in Example 13, into an aqueous solution containing the particular additive identified below in a concentration of 0.5% by weight (based on dry, finely ground coal dust) and 0.043% by weight (based on dry coal dust) of the anti-foam agent.

The amount of coal dust is chosen in such a way that the content of the resultant aqueous coal slurry, based on water-free coal, is 65% by weight.

Using the measuring spindle 3 of the Brookfield viscometer type LVT at 20° C., the following viscosities are obtained by the procedure described in Example 13:

(b) Additive from Example 5, pH adjusted to 7 with NaOH

| Initial viscosity | Terminal viscosity |
|---|---|
| 600 mPa.s | 440 mPa.s |

(c) Additive from Example 6, pH adjusted to 7 with NaOH

| Initial viscosity | Terminal viscosity |
|---|---|
| 2,300 mPa.s | 1,000 mPa.s |

(d) Additive from Example 7, pH adjusted to 7 with NaOH

| Initial viscosity | Terminal viscosity |
|---|---|
| 1,000 mPa.s | 610 mPa.s |

(e) Additive from Example 9, pH adjusted to 7 with NaOH

| Initial viscosity | Terminal viscosity |
|---|---|
| 1,100 mPa.s | 690 mPa.s |

(f) Additive from Example 10, pH adjusted to 7 with NaOH

| Initial viscosity | Terminal viscosity |
|---|---|
| 2,800 mPa.s | 1,180 mPa.s |

(g) Additive from Example 11, pH adjusted to 7 with NaOH

| Initial viscosity | Terminal viscosity |
|---|---|
| 1,600 mPa.s | 700 mPa.s |

(h) Additive from Example 12

| Initial viscosity | Terminal viscosity |
|---|---|
| 3,050 mPa.s | 1,300 mPa.s |

COMPARATIVE EXAMPLE 1

An aralkylphenyl polyalkylene glycol ether was used according to Example 2 of German Offenlegungsschrift No. 32-40-309-A-1 as an additive in the manner described above (Examples 14a-h) in a 0.5% concentration based on dry coal dust from coal 2. An aqueous coal slurry containing 65% by weight of coal dust (based on dry coal 2) had the following viscosities:

| Initial viscosity | Terminal viscosity |
|---|---|
| >20,000 mPa.s | >2,000 mPa.s |

COMPARATIVE EXAMPLE 2

An aralkylphenyl polyalkylene glycol ether reaction product was used as an additive according to Example 6 of German Offenlegungsschrift No. 32-40-309-A-1 in the manner described above (Comparative Example 1). A 65% (based on dry coal dust from coal 2) aqueous coal slurry had the following viscosities:

| Initial viscosity | Terminal viscosity |
|---|---|
| 5,400 mPa.s | 1,360 mPa.s |

COMPARATIVE EXAMPLE 3

A nonylphenyl polyethylene glycol ether having an oxethylation degree of 30 was used as an additive according to German Auslegeschrift No. 11-41-601. Under conditions otherwise identical with those of Comparative Example 1, the following values were found:

| Initial viscosity | Terminal viscosity |
|---|---|
| 11,400 mPa.s | >2,000 mPa.s |

EXAMPLE 15

Dependence on the type of coal

The procedure followed was that of Example 14, but the additive from Example 14(b) and the additive from Example 14(f) were used as flow improvers.

With the additive from Example 14(b) the following was found:

|  | Initial viscosity | Terminal viscosity |
|---|---|---|
| Coal 1 | 1,400 mPa.s | 480 mPa.s |
| Coal 2 | 600 mPa.s | 440 mPa.s |
| Coal 3 | 1,200 mPa.s | 380 mPa.s |

With the additive according to Example 14(f) the following was found:

|  | Initial viscosity | Terminal viscosity |
|---|---|---|
| Coal 1 | 1,800 mPa.s | 500 mPa.s |
| Coal 2 | 2,800 mPa.s | 1,180 mPa.s |
| Coal 3 | 1,500 mPa.s | 390 mPa.s |

EXAMPLE 16

Influence of the cations

The procedure followed was that of Example 14 (coal 2) but the solutions of the additive from Example 5 were adjusted with various bases to a pH of 7.0.

(a) Additive from Example 5, pH adjusted to 7 with KOH

| Initial viscosity | Terminal viscosity |
|---|---|
| 1,200 mPa.s | 530 mPa.s |

(b) Additive from Example 5, pH adjusted to 7 with NH$_3$

| Initial viscosity | Terminal viscosity |
|---|---|
| 1,100 mPa.s | 620 mPa.s |

(c) Additive from Example 5, pH adjusted to 7 with 1-phenyl-1-aminobutane

| Initial viscosity | Terminal viscosity |
|---|---|
| 800 mPa.s | 520 mPa.s |

(d) Additive from Example 10, pH adjusted to 7 with KOH

| Initial viscosity | Terminal viscosity |
|---|---|
| 3,200 mPa.s | 1,310 mPa.s |

(e) Additive from Example 10, pH adjusted to 7 with 4-tert-butylcyclohexylamine

| Initial viscosity | Terminal viscosity |
|---|---|
| 2,300 mPa.s | 620 mPa.s |

(f) Additive from Example 10, pH adjusted to 7 with 1-phenyl-1-aminoethane

| Initial viscosity | Terminal viscosity |
|---|---|
| 2,300 mPa.s | 1,010 mPa.s |

(g) Additive from Example 10, pH adjusted to 7 with 1-phenyl-1-aminobutane

| Initial viscosity | Terminal viscosity |
|---|---|
| 1,600 mPa.s | 760 mPa.s |

EXAMPLE 17

Influence of the additive concentration

The procedure followed was that of Example 14, with the exception that the concentration of the additive (based on dry coal dust) was varied.

Using the additive from Example 5 with a pH adjusted to 7 with NaOH, the following viscosities were found:

| Additive concentration (based on dry coal 2) | Initial viscosity | Terminal viscosity |
| --- | --- | --- |
| 0.3% by weight | >20,000 mPa.s | >2,000 mPa.s |
| 0.4% by weight | 1,600 mPa.s | 1,080 mPa.s |
| 0.5% by weight | 600 mPa.s | 440 mPa.s |
| 0.6% by weight | 700 mPa.s | 500 mPa.s |
| 0.7% by weight | 1,000 mPa.s | 620 mPa.s |
| 1.0% by weight | 2,300 mPa.s | 1,100 mPa.s |

EXAMPLE 18

Influence of coal concentration

The procedure followed is that of Example 14, with the exception that the concentration of coal dust (based on dry coal 2) is varied.

The concentration of the anti-foam agent and the additive (additive according to Examle 14(b) is held constant at 0.043% by weight and 0.5% by weight respectively, based on the coal content of the coal slurries prepared. The following viscosities are found:

| Solids Content | Initial viscosity | Terminal viscosity |
| --- | --- | --- |
| 65% | 600 mPa.s | 440 mPa.s |
| 68% | 1,600 mPa.s | 770 mPa.s |
| 70% | 1,800 mpa.s | 940 mPa.s |
| 71% | 3,200 mPa.s | 1,240 mPa.s |
| 72% | 4,800 mPa.s | >2,000 mPa.s |

EXAMPLE 19

Influence of the length of the polyalkylene glycol ether chain

Aqueous coal slurries containing 65% by weight of coal dust (coal 2, anhydrous), 0.5% by weight (based on dry coal dust 2) of a particular additive and 0.043% by weight (based on dry coal dust 2) of an anti-foam agent gave the following viscosities, when the length of the polyalkylene glycol ether chain in, for example, a partial ester of trimellitic anhydride according to Example 5, was varied:

| Chain length n according to structural formula 1 | Initial viscosity | Terminal viscosity |
| --- | --- | --- |
| 30 | 5,200 mPa.s | 1,700 mPa.s |
| 50 | 1,700 mPa.s | 920 mPa.s |
| 80 | 600 mPa.s | 440 mPa.s |
| 100 | 820 mPa.s | 650 mPa.s |
| 120 | 1,200 mPa.s | 890 mPa.s |

EXAMPLE 20

Influence of shear stress

Aqueous coal slurries, prepared from coal 2, are strongly prone to thickening when they are subjected to prolonged shear stress. When the additives according to the invention are used, slurries with a viscosity somewhat higher than at the start remain capable of flowing even after prolonged shearing. In order to approximate actual conditions, the following tests were carried out using a hose pump (model Delasco PMA 10) at flow velocities of about 0.7 m/s. In order to avoid losses due to evaporation, the aqueous coal slurries under test were continuously recirculated through the hosepipe in the closed system.

(a) Using an aqueous coal slurry containing 65% by weight (based on dry coal dust) of coal 2, 1% by weight (based on dry coal dust) of the additive according to Example 5 (pH adjusted to 7.0 with NaOH) and the usual amount of anti-foam agent, the following results were obtained:

Viscosities at the start of the test:

| Initial viscosity | Terminal viscosity |
| --- | --- |
| 2,300 mPa.s | 1,100 mPa.s |

After 7 hours of recirculation, the viscosity settled at the constant values of:

| Initial viscosity | Terminal viscosity |
| --- | --- |
| 3,600 mPa.s | 1,250 mPa.s |

The test was discontinued after 36 hours since the viscosities did not change.

After the test was ended, the pump could be re-used after a five hour interval without any difficulties.

(b) The procedure followed was that of Example 20(a) with the difference that 1% by weight of the additive according to Example 10 (with pH adjusted in the aqueous solution to 7.0 with NaOH) was used.

Viscosities at the start of the test:

| Initial viscosity | Terminal viscosity |
| --- | --- |
| 2,500 mPa.s | 1,430 mPa.s |

After 7 hours of recirculation, the viscosity settled to a constant value of:

| Initial viscosity | Terminal viscosity |
| --- | --- |
| 4,000 mPa.s | 1,600 mPa.s |

The test was discontinued after 36 hours since the viscosities did not change.

After the test was ended, the pump could be re-used after a five-hour interval without any difficulties.

COMPARATIVE EXAMPLE 4

The procedure followed was that of Example 20(a) and 20(b) with the difference that the additive used was 1% by weight of the compound according to German Offenlegungsschrift No. 3,240,309 A-1 (therein cited as Example 6).

Viscosities at the start of the test:

| Initial viscosity | Terminal viscosity |
| --- | --- |
| 6,000 mPa.s | 1,650 mPa.s |

After 90 minutes the test had to be discontinued since further conveyance by the pump used was impossible owing to the thickening of the material. The same phenomena were observed within 30–120 minutes when the additive concentration of the additive from Example 6 of the German Offenlegungsschrift No. 3,240,309 A-1 was varied between 0.5 and 1.5% by weight (based on dry coal dust 2) or when a compound according to Example 3 of the German Offenlegungsschrift No. 3,240,309 A-1 was used as the additive in various concentrations.

EXAMPLE 21

The procedure followed was that of Example 14(b), with the exception that a part of the water was replaced by methanol. The following values were obtained:

| Ratio water/methanol | Initial viscosity | Terminal viscosity |
|---|---|---|
| 100/0 | 600 mPa.s | 440 mPa.s |
| 85/15 | 560 mPa.s | 400 mPa.s |
| 70/30 | 590 mPa.s | 420 mPa.s |

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. A method of reducing the viscosity of an aqueous coal slurry, which comprises adding to said slurry a viscosity-reducing effective amount of at least one compound of the formula I

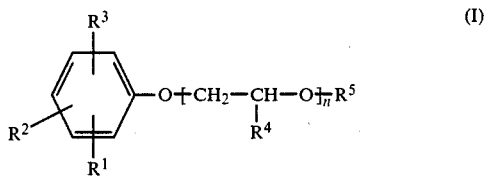

(I)

wherein $R^1$, $R^2$ and $R^3$ are the same or different and denote hydrogen, straight-chain or branched alkyl radicals with 1 to 18 carbon atoms in the alkyl radical, alkyl radicals substituted by aralkyl with 1 to 10 carbon atoms in both alkyl radicals, or an aralkyl, naphthyl-alkyl or anthracyl-alkyl group with 1 to 18 carbon atoms in the alkyl group which may be straight-chain or branched, n is a number from 30 to 400, $R^4$ may be hydrogen, a methyl, ethyl or propyl radical, $R^5$ denotes a radical of the formula

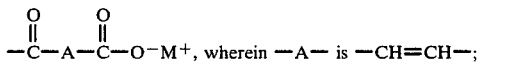, wherein —A— is —CH=CH—;

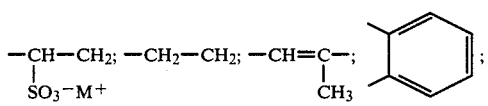

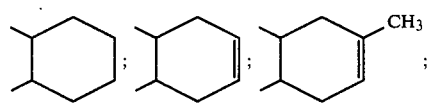

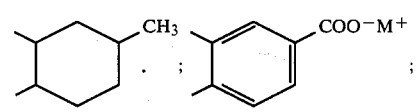

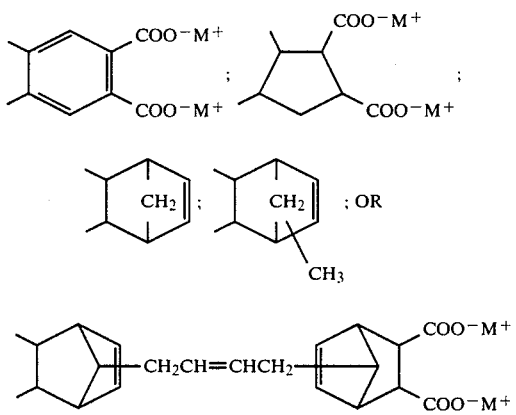

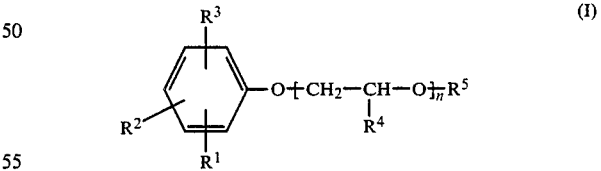

in which $M^+$ represents a hydrogen ion, a metal ion, an ammonium ion, or a cation of the type $HN^+H_2—R^6$, wherein $R^6$ denotes an unsubstituted or substituted alkyl radical with 1 to 12 carbon atoms, a cycloalkyl radical or a phenyl radical.

2. The method of claim 1, wherein the compound of formula I is present in the aqueous coal slurry in an amount of 0.1 to 3.0% by weight based on the content of anhydrous coal.

3. The method of claim 1, wherein the aqueous coal slurry contains 30 to 85% by weight of coal.

4. The method of claim 1, wherein said aqueous coal slurry contains an anti-foam agent and a stabilizer.

5. The method of claim 1, wherein n is between 30 and 250.

6. The method of claim 1, wherein n is between 50 and 120.

7. The method of claim 1, wherein $R^5$ is derived from trimellitic acid, phthallic acid, or pyromellitic acid.

8. The method of claim 1, wherein $M^+$ is a cation derived from 1-phenyl-1-aminobutane, 1-phenylaminoethane, or 4-tert-butylcyclohexylamine.

9. The method of claim 1, wherein said coal is lignite, coke, anthracite, black coal, bituminous of subbituminous coal.

10. An aqueous coal slurry, comprising a viscosity-reducing amount of a compound represented by formula I:

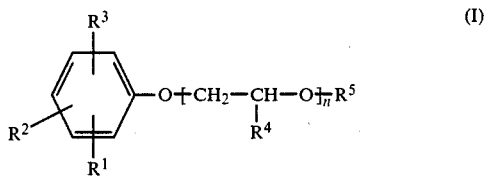

(I)

wherein $R^1$, $R^2$ and $R^3$ are the same or different and denote hydrogen, straight-chain or branched alkyl radicals with 1 to 18 carbon atoms in the alkyl radical, alkyl radicals substituted by aralkyl with 1 to 10 carbon atoms in both alkyl radicals or an aralkyl, naphthyl-alkyl or anthracyl-alkyl group with 1 to 18 carbon atoms in the alkyl group which may be straight-chain or branched, n represents a number from 30 to 400, $R^4$ may be hydrogen, a methyl, ethyl or propyl radical, $R^5$ denotes a radical of the formula

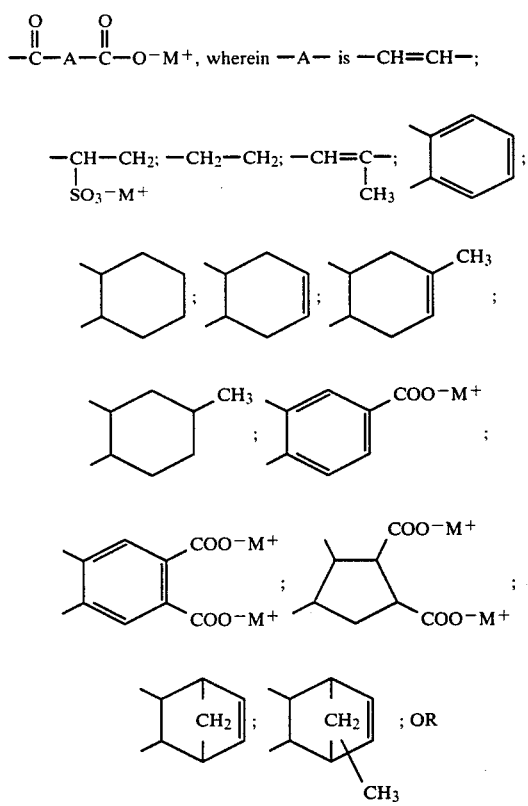

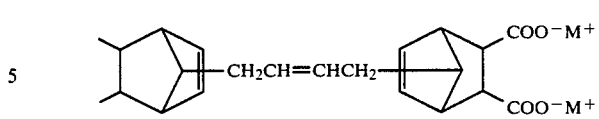

wherein M+ represents a hydrogen ion, a metal ion, an ammonium ion, or a cation of the type $HN^+H_2$—$R^6$ wherein $R^6$ denotes an unsubstituted or substituted alkyl radical with 1 to 12 carbon atoms, a cycloalkyl radical or a phenyl radical.

11. The slurry of claim 10, wherein the amount of the compound of formula I is 0.1 to 3.0% by weight based on the content of anhydrous coal.

12. The slurry of claim 10, which contains 30 to 85% by weight of coal.

13. The slurry of claim 10, which further contains an anti-foam agent and a stabilizer.

14. The slurry of claim 10, wherein n is between 30 and 250.

15. The slurry of claim 10, wherein n is between 50 and 120.

16. The slurry of claim 10, wherein $R^5$ is derived from trimellitic acid, phthalic acid, or pyromellitic acid.

17. The slurry of claim 10, wherein M+ is a cation derived from 1-phenyl-1-aminobutane, 1-phenylaminoethane, or 4-tert-butylcyclohexylamine.

18. The slurry of claim 10, wherein said coal is lignite, coke, anthracite, black coal, bituminous or subbituminous coal.

* * * * *